June 29, 1965  E. W. S. ASHTON  3,191,230
MACHINES FOR EXTRUDING TUBES
Filed Aug. 1, 1963  5 Sheets-Sheet 1

INVENTOR
Ernest W. S. Ashton
By Walton, Cole, Grindle & Walton
ATTORNEYS

June 29, 1965  E. W. S. ASHTON  3,191,230
MACHINES FOR EXTRUDING TUBES
Filed Aug. 1, 1963  5 Sheets-Sheet 5
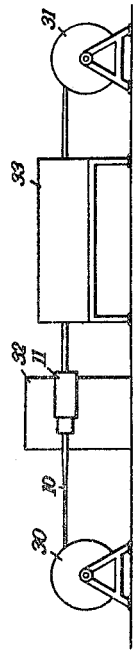
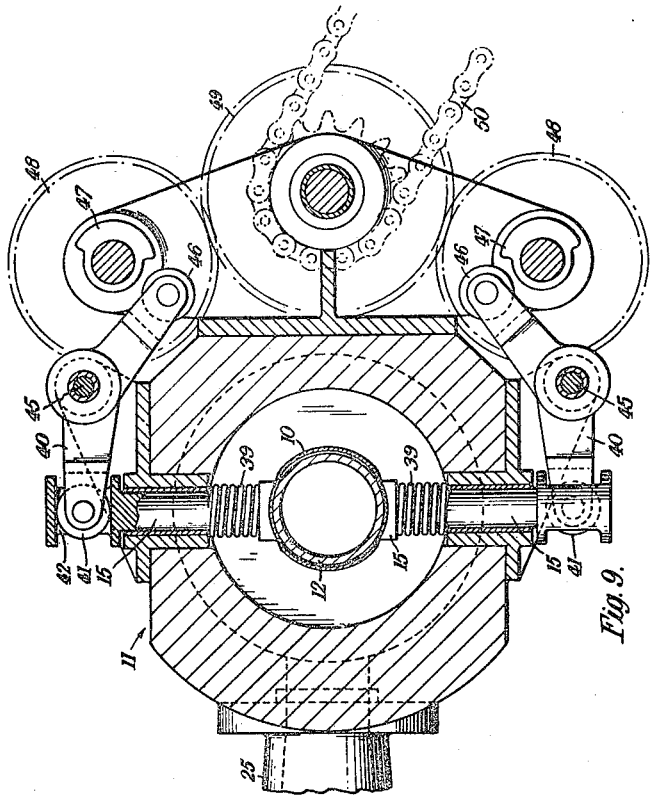
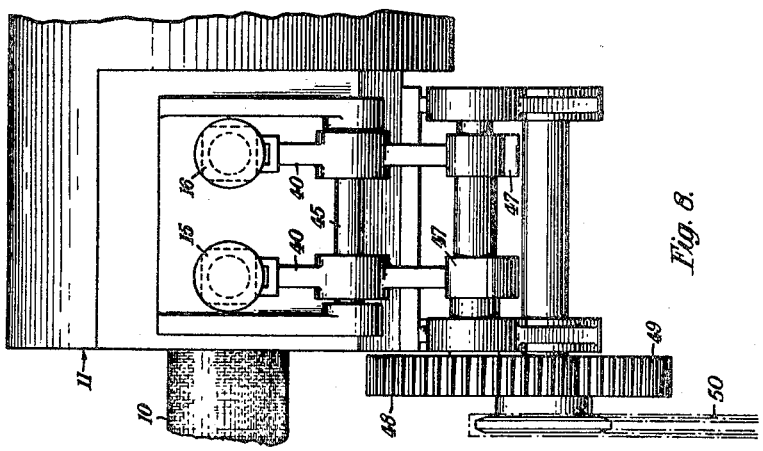
INVENTOR
Ernest W.S. Ashton
By Watson, Cole, Grindle & Watson
ATTORNEYS

United States Patent Office 3,191,230
Patented June 29, 1965

3,191,230
MACHINES FOR EXTRUDING TUBES
Ernest William Sheldon Ashton, Bentham, near Lancaster, England, assignor to George Angus & Company Limited, Newcastle-upon-Tyne, England, an English company
Filed Aug. 1, 1963, Ser. No. 299,266
Claims priority, application Great Britain, Aug. 9, 1962, 30,618/62
5 Claims. (Cl. 18—13)

This invention relates to machines for extruding tubes and comprises improvements in and modifications of the machine which is the subject of U.S. Patent No. 2,990,577.

The machine claimed in said patent is a machine for making impermeable tubes comprising a permeable reinforcing sleeve with an impermeable internal coating of synthetic resin or similar material, the machine comprising an extrusion head having a passage extending through it and terminating in an extrusion orifice, a mandrel within the passage, the mandrel being adapted to support the reinforcing sleeve and being provided along part of its length inside the passage with openings and terminating at its forward end in a portion of smaller cross-section, clamping means outside the head for locating the mandrel in position, means for drawing the sleeve under tension over the mandrel and through the passage and the extrusion orifice, and means for injecting synthetic resin or other coating material under pressure into the passage so that when the machine is in operation the synthetic resin or other coating material passes through the sleeve and into the openings of the mandrel and is extruded through the orifice as an internal coating on the reinforcing sleeve as the latter is pulled through the head, said internal coating having an internal section corresponding to that of the portion of the mandrel of smaller cross-section.

Due to the fact that the mandrel of the machine described in U.S. Patent No. 2,990,577 is clamped outside the extrusion head it is necessary to release the clamping means from time to time in order to feed a length of sleeve in corrugated form on to the portion of the mandrel between the clamping means and the extrusion head and then to clamp the mandrel again, so that operation of the machine is, to this extent discontinuous.

The present invention provides an improvement in or modification of the aforesaid machine in which the clamping means for the mandrel is located inside the extrusion head. It is accordingly unnecessary for the mandrel to extend from the rear end of the extrusion head and the sleeve can be fed continuously to the extrusion head without the necessity for corrugating it or interrupting operation of the machine while such corrugations are formed.

Preferably the clamping means serves to clamp the mandrel alternately and intermittently at spaced points within the extrusion head and allow the sleeve to be fed continuously through the extrusion head, notwithstanding the fact that it is clamped to the mandrel, by virtue of the elasticity of the sleeve.

The clamping means may be arranged to clamp the mandrel alternately at positions spaced either along its length or around its circumference.

The present invention includes a further modification of the machine described in U.S. Patent No. 2,990,577 in which the clamping means for the mandrel is located outside the extrusion head and the coating material is injected intermittently into the interior of the mandrel through the clamping means. In this case the coating is applied directly to the interior of the sleeve from the mandrel in the extrusion head and may be forced through the sleeve to form an external coating thereon. If preferred, however, an external coating of plastic material can be applied to the sleeve before it reaches the clamping means, and this is advantageous because it is sometimes desirable to produce an impermeable tube having an outer coating of a plastic material of different characteristics from that constituting the lining of the tube.

Certain embodiments of the invention will now be described in more detail with reference to the accompanying drawings, in which:

FIG. 1 is a diagrammatic longitudinal section through the extrusion head of a machine in which the mandrel is clamped alternately within the extrusion head at points spaced along its length, FIG. 2 is a similar view of an alternative machine in which the mandrel is clamped within the extrusion head at points spaced around its circumference, FIG. 3 is a diagram showing a machine in which the coating material is injected into the interior of the mandrel, FIG. 4 is a longitudinal section through a modified form of extrusion head for use in a machine of U.S. Patent No. 2,990,577.

Figure 1:
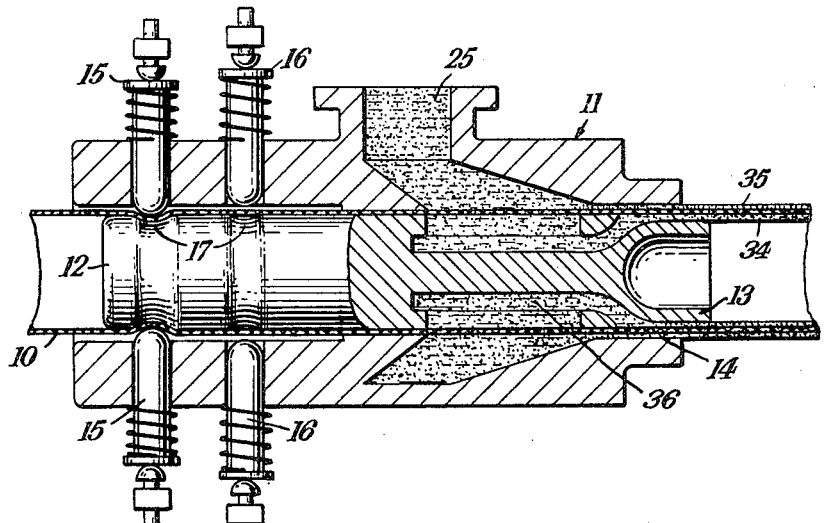
Figure 7:
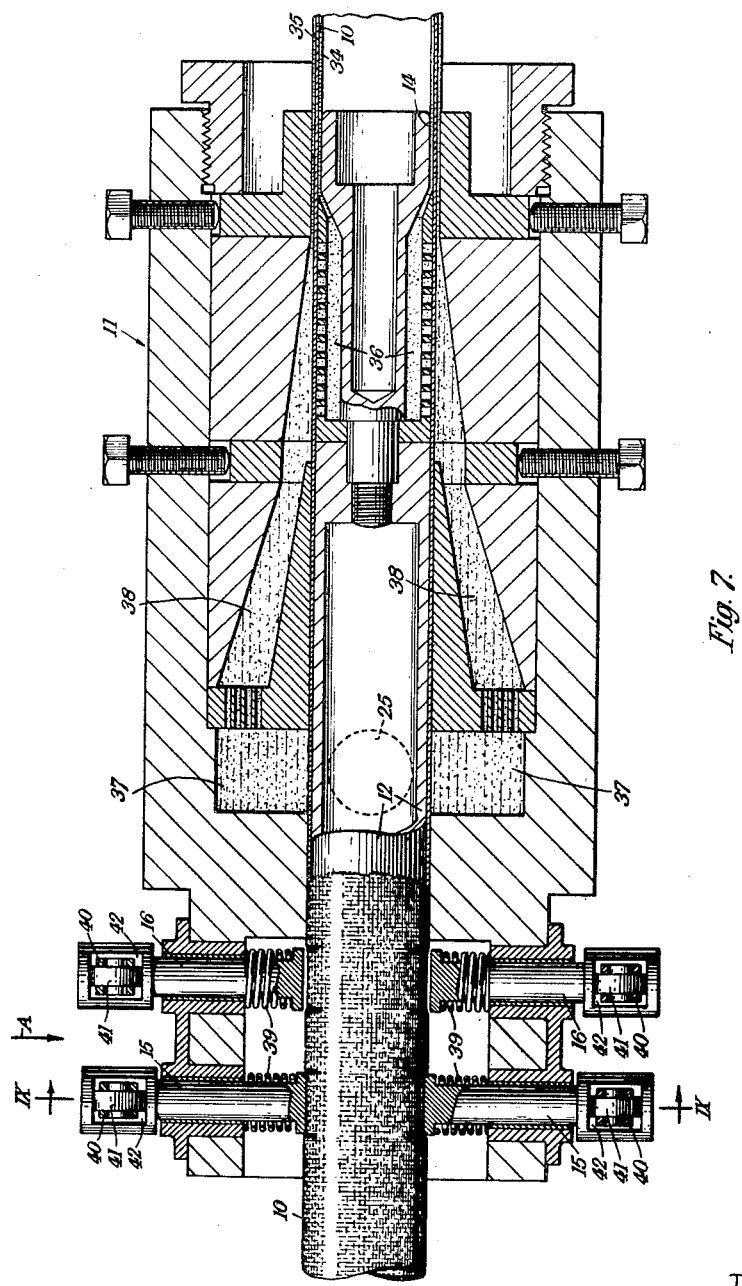

FIG. 7 is a longitudinal section through an extrusion head of the kind shown in FIG. 1 illustrating the mechanism in more detail, FIG. 8 is a view looking in the direction of the arrow A in FIG. 7, FIG. 9 is a section on the line IX—IX in FIG. 7, and FIG. 10 is a diagram showing a complete machine for the production of lined fire hose embodying an extrusion head of the kind shown in FIGS. 1 and 7–9.

As shown in FIG. 10, a woven textile jacket is drawn continuously from a reel 30 by a wind-up drum 31 through an extrusion head 11, to which polyvinyl chloride or other suitable lining material is supplied from an extrusion machine 32. On its way from the extrusion head 11 to the wind-up drum the lined hose passes through a cooling chamber 33.

The general principle of operation of the extrusion head 11 is shown in FIG. 1. The extrusion head contains a mandrel 12 having a reduced forward portion 13 which defines with the outer portion of the extrusion head an extrusion orifice 14. The plastic material is forced into the extrusion head through an inlet 25 and passes through the jacket 10 and longitudinal slots 36 in the mandrel to the extrusion orifice 14. The emerging jacket thus has an internal lining 34 and an external coating 35 of the plastic material. The mandrel is located in the extrusion head by two pairs of tappets 15, 16, which are alternatively moved in and out by associated rocker arms into engagement with recesses 17 in the mandrel. As the tappets 16 close from the position shown, the tappets 15 open, allowing a short length of the tensioned jacket to creep into the space between the two pairs of tappets. This extra length of jacket is fed on to the extrusion orifice under the pull of the wind-up drum when, immediately afterwards the tappets 16 open and the tappets 15 close. When the tappets 15 are closed, the elasticity of the jacket permits it to advance under the pull of the wind-up drum.

The extrusion head is shown in more detail in FIGS. 7–9. As indicated in FIG. 7, the plastic material is forced from the inlet 25 through an annular chamber 37 and thence through passages 38 to the portions of the jacket which overlie the slots 36 in the mandrel. The tappets 15, 16 are urged towards the clamping position by springs 39 but are periodically lifted from the clamping position by rocker arms 40, carrying rollers 41 which engage in slots 42 in heads formed on the tappets.

The rocker arms 40 are pivoted at 45 and carry rollers 46 engaging cams 47. The cams 47 are driven by gears 48 meshing with a driving gear 49 which, in turn, is driven by a chain drive 50. The cams 47 are so phased that when one pair of grippers 15 is clamped against the mandrel, as shown in FIG. 9, the other pair of grippers 16 is retracted from the mandrel.

Figure 2:
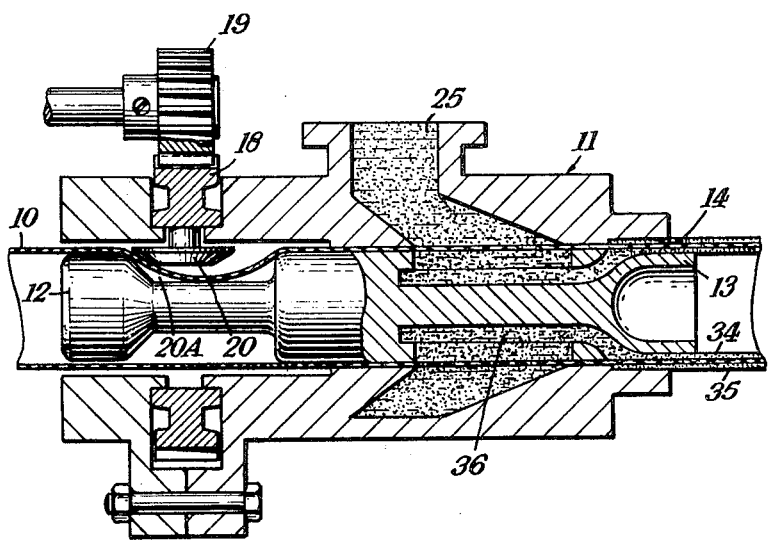

In the case of the alternative clamping mechanism shown in FIG. 2, the tappets are replaced by a ring 18 having external gear teeth which mesh with a pinion 19 which maintains the ring 18 in continuous rotation. A wheel 20 mounted for rotation on the interior of the ring about an axis normal to the mandrel, cooperates with a recess 20A in the mandrel and serves to retain the mandrel in position while permitting of continuous forward feed of the jacket. As shown in FIG. 2, the wheel 20 depresses the jacket 10 smoothly into the recess 20A in the mandrel. If desired, the wheel 20 can be duplicated at diametrically opposite positions in the head to provide a balanced construction.

Figure 3:
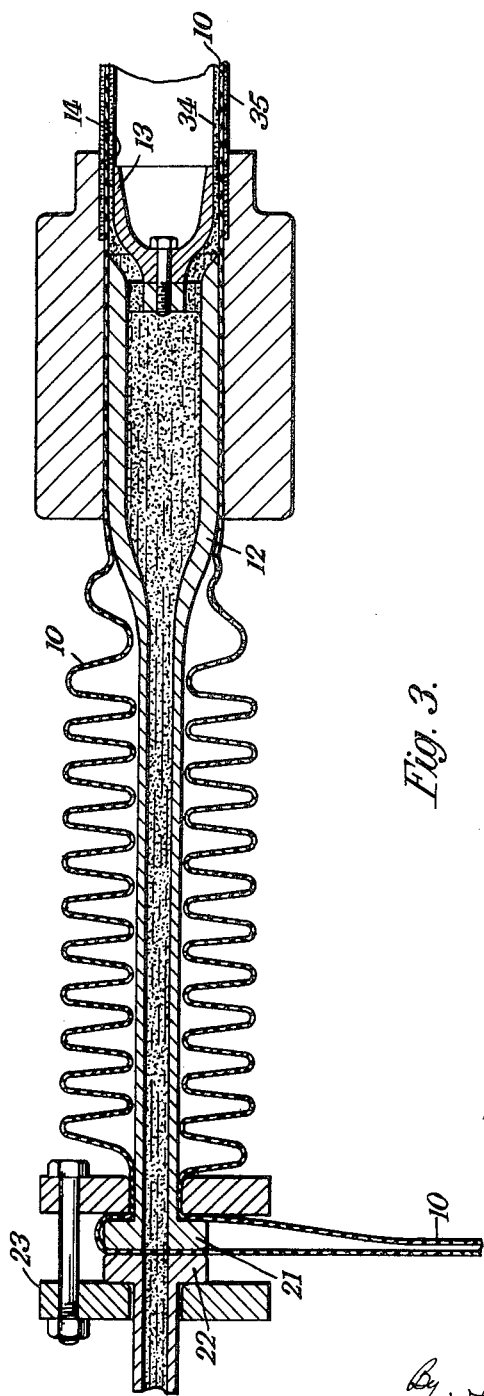

In the arrangement shown in FIG. 3, the mandrel 12 is clamped externally of the extrusion head as in U.S. Patent No. 2,990,577. The rearwardly extending portion of the mandrel carries a flange 21 adjacent a flange 22 on an extruder for the plastic material. The plastic is injected intermittently from the extruder into the interior of the mandrel. This form of apparatus operates intermittently. The jacket is drawn forwardly over the mandrel in corrugated form, as shown, while the clamping device 23 is relaxed. The clamping device 23 is then closed to lock the flanges 21, 22 together and the extruder is started to inject plastic through the mandrel into the extrusion head, the wind-up drum also being started to draw the jacket through the extrusion head. When the reserve of jacket represented by the corrugations is nearly exhausted, the machine is stopped, the clamping device 23 released and the above indicated procedure repeated.

Figure 4:
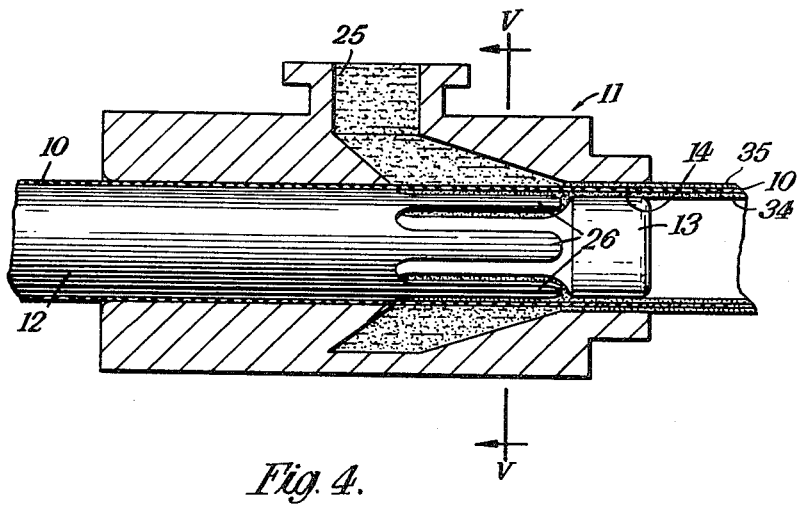
Figures 5, 6:
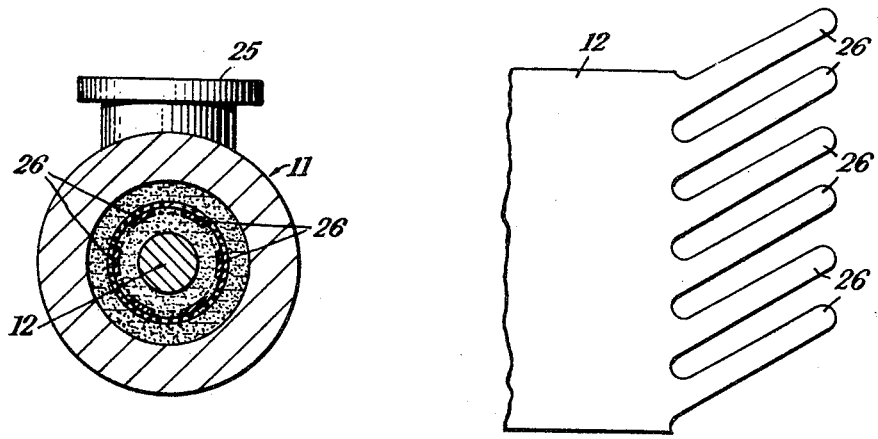
FIG. 5 is a section on the line V—V in FIG. 4.
FIG. 6 is a diagram showing a modified arrangement of splines.

FIGS. 4 and 5 show a modified form of extrusion head for use in the machine of U.S. Patent No. 2,990,577. As shown the longitudinal openings in the mandrel are in this case constituted by openings in the mandrel shown in FIG. 1 constituted by the spaces between splines 26 on the exterior of the mandrel which may be separately fabricated and fixed to the mandrel and may, if desired and as shown in FIG. 6, be inclined to the longitudinal axis of the mandrel.

What I claim as my invention and desire to secure by Letters Patent is:

1. A machine for the continuous production of an impermeable tube comprising a permeable reinforcing sleeve having an impermeable internal coating of thermoplastic material, said machine comprising an extrusion head having a passage extending through it and terminating in an extrusion orifice, a mandrel within said passage, said mandrel being adapted to support the reinforcing sleeve and being provided along part of its length inside the passage with internal passages communicating with said extrusion orifice and terminating at its forward end in a portion of smaller cross-section, clamping means inside the head and external to the mandrel which coact with said mandrel at spaced points to locate it in position, mechanism for moving said clamping means being effective alternately in relation to the mandrel to hold the sleeve and mandrel alternately and intermittently at said spaced points within said extrusion head, means for drawing the sleeve continuously under tension over the mandrel and through the passage and the extrusion orifice, and means for injecting thermoplastic coating material under pressure into the extrusion head exteriorly of said sleeve, whereby some of said coating material is forced through the sleeve and into the internal passages of the mandrel and is extruded through the orifice as an internal coating on the sleeve as the latter is drawn through the head.

2. A machine as claimed in claim 1, including means for actuating the clamping means to clamp the mandrel alternately at positions spaced along the length of said mandrel.

3. A machine as claimed in claim 2, in which the clamping means is constituted by tappets and means for moving said tappets inwardly and outwardly in alternation to engage alternative recesses in the outer surface of the mandrel.

4. A machine as claimed in claim 5, in which the clamping means is constituted by a wheel mounted for rotation on a carrier about an axis normal to the length of the mandrel and means for rotating the carrier around the axis of the mandrel to cause said wheel to clamp the mandrel successively at positions spaced around its circumference.

5. A machine as claimed in claim 1, in which the clamping means is rotatable around the mandrel and clamps the mandrel alternately at positions spaced around the circumference of said mandrel.

References Cited by the Examiner

UNITED STATES PATENTS

| | | | |
|---|---|---|---|
| 2,600,254 | 6/52 | Lysobey. | |
| 2,620,515 | 12/52 | Olson | 18—141 XR |
| 2,732,588 | 1/56 | Myers | 18—13 |
| 2,767,431 | 10/56 | De Laubarede | 18—141 XR |
| 2,990,577 | 7/61 | De Laubarede | 18—14 |
| 3,106,748 | 10/63 | Skobel | 18—13 XR |

FOREIGN PATENTS 624,006   7/61   Canada.

J. SPENCER OVERHOLSER, *Primary Examiner.*

MICHAEL V. BRINDISI, WILLIAM J. STEPHENSON, *Examiners.*